United States Patent [19]

Snider et al.

[11] Patent Number: 4,904,893
[45] Date of Patent: Feb. 27, 1990

[54] STATOR END CAP INSULATOR ASSEMBLY INCLUDING END TURN VENTILATION AND LEAD WIRE TIE DOWN STRUCTURE

[75] Inventors: S. Duke Snider; Daniel R. Messner, both of St. Louis County, Mo.

[73] Assignee: Emerson Electric Co., St. Louis, Mo.

[21] Appl. No.: 263,614

[22] Filed: Oct. 27, 1988

[51] Int. Cl.⁴ .................................................. H02K 3/46
[52] U.S. Cl. ..................................... 310/260; 310/43; 310/58; 310/71; 310/89
[58] Field of Search ..................... 310/42, 43, 260, 71, 310/194, 214, 52, 58, 59, 60 R, 254, 217, 218, 90, 91, 258, 259, 180, 208, 89, 270

[56] References Cited

U.S. PATENT DOCUMENTS

| 3,027,475 | 3/1962 | Gaudry | 310/214 |
| 3,780,323 | 12/1973 | Swain | 310/71 |
| 3,979,615 | 9/1976 | Neff | 310/71 |
| 4,322,647 | 3/1982 | Neroda | 310/71 |
| 4,340,829 | 7/1982 | McCoy | 310/71 |
| 4,484,096 | 11/1984 | Sauerwein | 310/194 |
| 4,707,627 | 11/1987 | Best | 310/260 |

FOREIGN PATENT DOCUMENTS 3604980  8/1986  Fed. Rep. of Germany ........ 310/71

Primary Examiner—R. Skudy
Attorney, Agent, or Firm—Polster, Polster and Lucchesi

[57] ABSTRACT

An improved stator end cap insulator assembly for a stator core wherein molded end cap insulator structure for the stator core includes end turn restraining structure having ventilation recesses for the end turns of the magnetic wire coils wound about the pole pieces and further includes structure for securing external lead wires cooperative with the restraining and ventilating structure.

7 Claims, 2 Drawing Sheets

STATOR END CAP INSULATOR ASSEMBLY INCLUDING END TURN VENTILATION AND LEAD WIRE TIE DOWN STRUCTURE

BACKGROUND OF THE INVENTION

The present invention relates to end cap insulator for an electromagnetic device and more particularly to an improved end cap insulator assembly for a stator core having ventilation recesses for the end turns of magnet wires wound around stator core pole pieces and means to secure external lead wires to the magnet wires.

In the construction of stators for electromagnetic motors, laminations of ferromagnetic material are stacked together to form a stator core with pole pieces circumferentially spaced about the central axis of the core separated by openings extending through the core. Magnet wires are wound by automated winding around each pole to extend through adjacent openings on opposite side flanks of the same pole with the end turns of the winding passing over end cap insulator structure mounted on opposite core faces as described hereinafter.

As is disclosed in U.S. Pat. No. 4340829, issued to Billy R. McCoy on July 20, 1982, it is known in the art to provide molded end cap insulator structure of insulating material designed for attachment to each end face of the ferromagnetic stator core before magnet wires are wound through adjacent openings on the side flanks of each pole and through corresponding openings in the end cap insulator structure with the end turns of the wound magnet wires passing over end cap insulator structure surrounding such corresponding openings.

In accordance with the present invention, it is recognized that these end turns are often surrounded on the inner and outer peripheral sides thereof by end cap insulator structure in the form of flange member pairs which serve to maintain the end turns within a desired radial distance of the central axis of the stator core. The present invention, further recognizing that these past flange member pairs have inhibited proper ventilation of the stator core-end turn assembly, provides a flange arrangement which serves not only to maintain the end turns at the desired radial distance relative the central axis of the stator core but, at the same time, allows for proper ventilation of the core-end turn assembly and further provides part of a suitable structure for securing against vibration and other undesirable forces the external lead wire means relative the stator core and magnet wire coils associated therewith.

Various other features of the present invention will become obvious to one skilled in the art upon reading the disclosure set forth herein.

SUMMARY OF THE INVENTION

More particularly, the present invention provides an improved stator end cap insulator assembly for a stator core having a central axis with pole pieces having solid end face portions circumferentially spaced about the central axis of the core separated by openings extending through the core with magnet wires wound around each pole to extend through adjacent openings on opposite sides of each pole to provide end turns adjacent the solid end face portions and external lead wire means connected to the magnet wires comprising: molded end cap insulator structure for attachment to opposite end faces of the stator core including a pair of plate members formed into a shape corresponding to the end faces of the stator core and including spaced openings aligned with the spaced openings in the stator core separated by solid end portions to overlie the solid end face portions of the pole pieces with the magnet wires passing thereover to provide magnet wire end turn structure, the plate members including end turn restraining and ventilating means positioned along the peripheral border thereof adjacent the solid end portions to help maintain the magnet wire end turns a preselected distance relative the stator core central axis and provide ventilation of magnet wire end turn structure, a portion of the end turn restraining and ventilating means being positioned immediately adjacent the end turns to restrain the end turns and a portion being spaced from the end turns to allow ventilation of the end turns. Further, the present invention provides a novel fastening means cooperating with the end turn restraining and ventilating means to secure external leads for the stator core assembly.

It is to be understood that various changes can be made by one skilled in the art in one or more of the several parts of the novel structure described herein without departing from the scope or spirit of the present invention.

BRIEF DESCRIPTION OF THE DRAWINGS

Referring to the drawings which disclose one advantageous embodiment of the several features of the present invention.

DETAILED DESCRIPTION OF THE DRAWINGS

Figure 1:
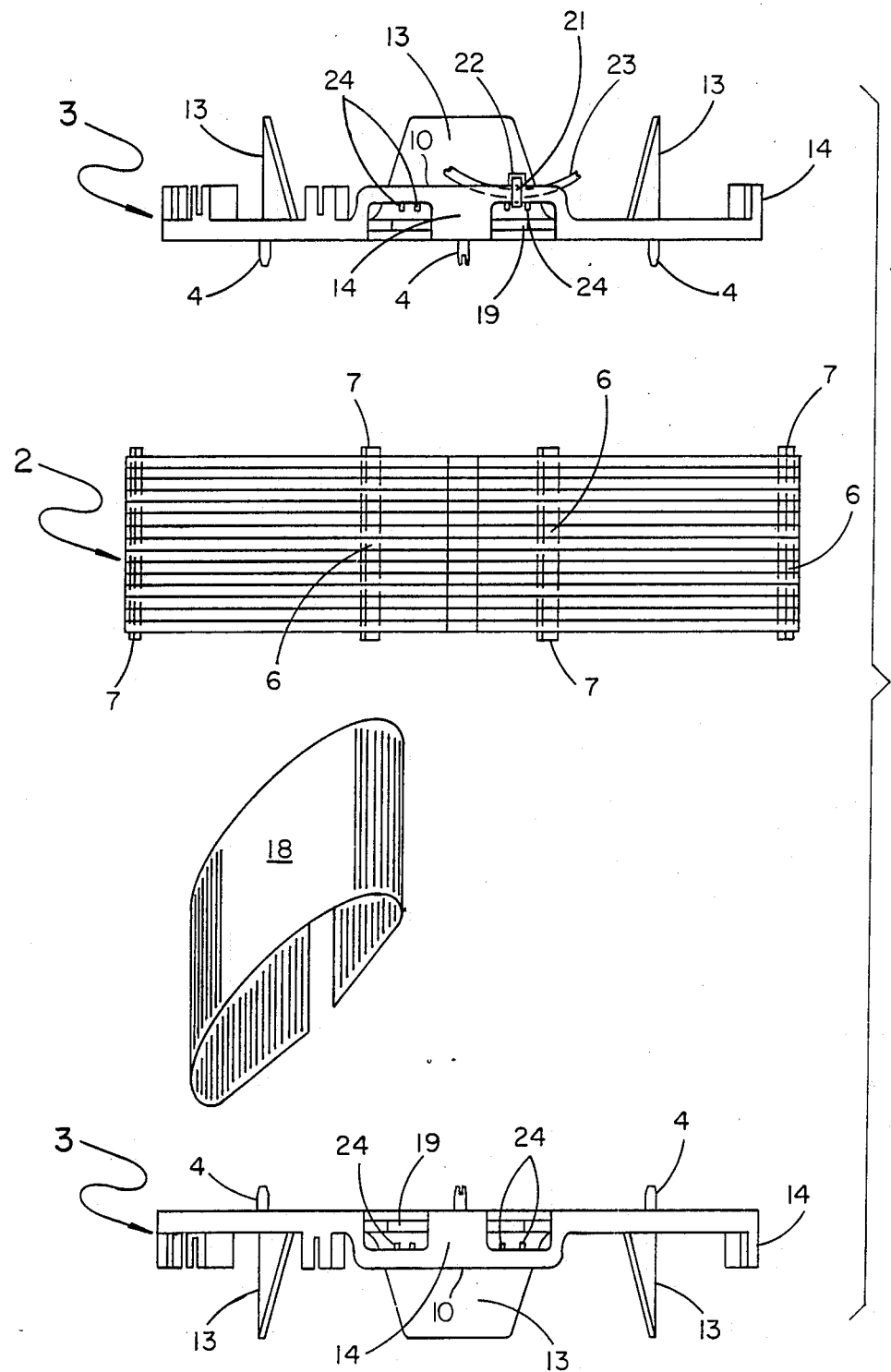
FIG. 1 is an exploded side elevational view of the inventive stator assembly insulating structure, including a stator core, insulating liner for one core opening and opposed molded insulator end caps which incorporate the unique ventilating and external tie down features in combination with molded flange pairs which serve to maintain end turns of coiled magnet wires a preselected distance from the central axis of the stator core.

Referring to FIG. 1 of the drawings which discloses an exploded side view of the inventive stator assembly insulating structure, annular stator core 2, formed from a plurality of annular laminations of ferromagnetic material, as is known in the art, can be seen to receive at opposed end faces thereof a pair of opposed molded end cap insulators 3 which can be molded to properly function when engaged with either face of stator core 2. The end cap insulators 3 are each provided with a plurality of spaced, split guide pins 4 extending normally from the undersurface thereof and adapted to nestingly engage with suitably sized and correspondingly positioned and spaced apertures (not shown) in the opposed faces of stator core 2 to fasten the opposed end cap insulators 3 to the stator core 2. As is known in the art, stator core 2 is provided with a plurality of slots which extend therethrough, each slot serving to receive and support a shading element 6 positioned near the central opening of the annular core. The shading elements 6 advantageously are formed of copper and each has the extremities or tips 7 thereof protruding slightly outward beyond the end faces of the stator core 2.

Figure 2:
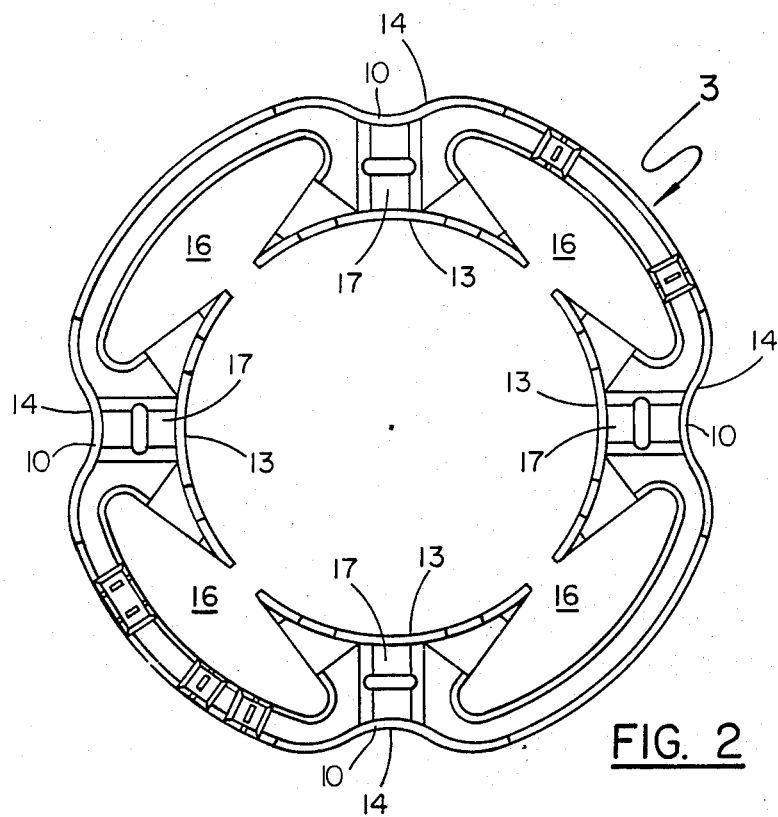
FIG. 2 is a top view of the end cap insulator structure of FIG. 1.
Figure 3:
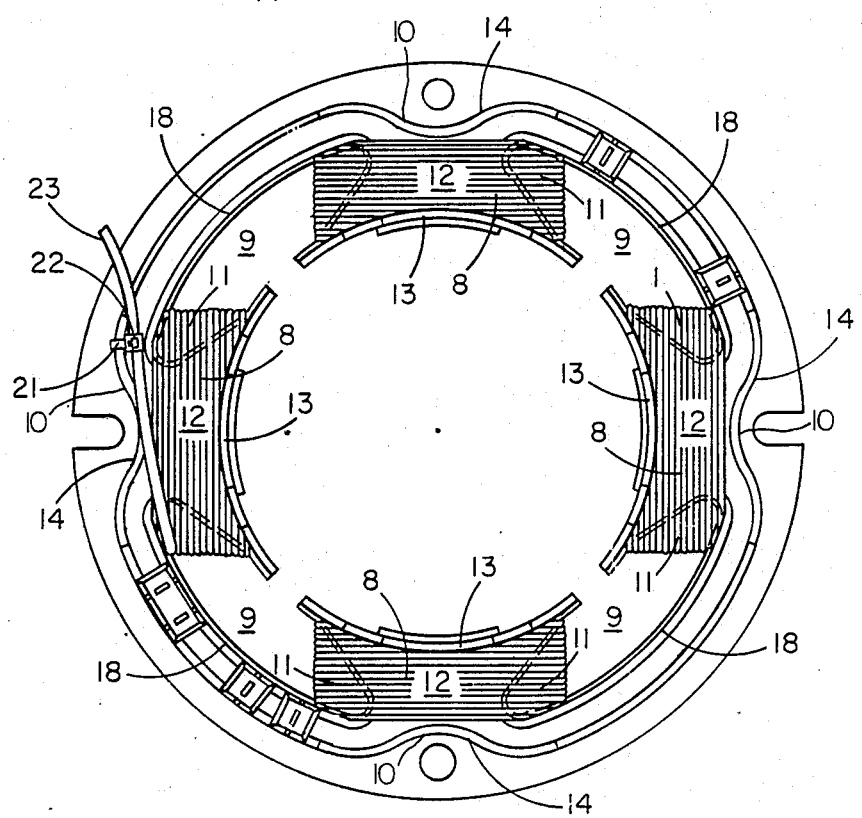
FIG. 3 is a top view of the structure of FIG. 1 in schematic assembled relation, further disclosing the magnet wires which have been wound around the pole pieces of the stator core with the end turns thereof resting between the molded flange pairs as disclosed in FIG. 1 and further disclosing the external wire tie down feature of FIG. 1.

As also is known in the art and referring to FIG. 3 of the drawings, annular stator core 2 includes pole pieces 8 circumferentially spaced about the central axis of the core and separated by openings 9 of preselected oval shaped cross-section extending through the core. In the embodiment disclosed, four such pole pieces 8 are provided separated by four openings 9, but it is to be understood that the number of such pole pieces and openings can be varied in accordance with the design characteristics of the motor—some of which can include six or even eight or more of such pole pieces and openings. Each pole piece has a magnet wire 11, advantageously of copper, automatedly wound therearound to provide end turns 12 with pairs of spaced, opposed inner and outer flanges 13 and 14 respectively maintaining end turns 12 of magnet wire 11 the desired radial distance from the central axis of stator core 2. In this regard, it is to be further noted from FIGS. 1 and 2 of the drawings that each of the pair of end cap insulators 3 attached to opposite end faces of stator core 2 by guide pins 4 includes an annular plate member formed into a shape corresponding to the end faces of annular stator core 2 to provide spaced oval openings 16 (FIG. 2) to be aligned with spaced oval openings 9 in stator core 2, the spaced oval openings 16 being separated by solid portions 17 which overlie the end faces of the pole pieces 8 and over which pass end turns 12 of magnet wire 11 (FIG. 3). The end cap insulators 3 can be mold formed from any one of a number of suitably insulating moldable materials to include the pairs of spaced inner and outer flanges 13 and 14 respectively between which end turns 12 nest to be maintained a preselected radial distance from the central axis of stator core 2. Advantageously, the end cap insulators 3 can be formed from a glass fiber reinforced thermoplastic polyester material molded in conforming shape with the end faces of stator core 2. As also is known in the art, each of the several openings 9 of stator core 2 is provided with an endless insulating liner 18 (only one of the four required liners for the four openings of stator core being fully disclosed for the purposes of illustration).

In accordance with one novel feature of the present invention, not only does each pair of spaced, opposed inner and outer flanges 13 and 14 respectively serve to maintain the end turns 12 a preselected radial distance from the central axis of stator core 2 but, in addition, at least the outer flanges 14 can be provided with suitable ventilating apertures 19 (FIG. 1) therein to insure proper ventilation of end turns 12. These apertures 19 in flanges 14 along the periphery of the outer flanges 14 in spaced relation to end turns 12 so that so that adjacent apertures in each of flanges 14 are separated by a radially inturned portion of each flange 14 which inturned portion is positioned immediately adjacent and in restraining relation to an end turn 12 providing a bridge like form (FIGS. 1 and 3), a portion of which ventilates and a portion of which restrains an end turn. The upper portion or radially inturned span of this bridge-like form serves to receive a fastening means in the form of a longitudinally extending flexible belt 21 which can be formed from a suitable material such as a flexible plastic. A buckle 22, which also can be of integral plastic material, is formed at one end thereof. Belt 21 is sized to be looped through the ventilating aperture 19 of the bridge-like form of outer flange 14, around an external lead wire 23 for stator core 2, the span of the bridge-like form and through buckle 22.

In this regard, it is to be noted that the undersurface of radially inturned span 10 includes spaced guide standards 24 integral therewith through which belt 21 passes to be maintained in preselected position relative radially inturned span 10. Although only one such fastening belt structure is disclosed in the drawings, it is to be understood that several such belt structures can be employed along the periphery of the molded end cap structure in accordance with the length of the external lead wire 23.

Thus, not only do the flange pairs serve to maintain the end turns in a preselected position relative the stator core axis, but they also insure appropriate ventilation of the stator core—particularly the end turns—and further insure the securing of external lead wire 23 to the stator core assembly.

The invention claimed is:

1. An improved stator end cap insulator assembly for a stator core having a central axis with pole pieces having solid end face portions circumferentially spaced about the central axis of said stator core separated by openings extending through said core with magnet wires wound around each pole to extend through adjacent openings on opposite sides of each pole to provide end turns adjacent said solid end face portions and external lead wire means connected to said magnet wires comprising:

molded end cap insulator structure for attachment to opposite end faces of said core including a pair of plate members formed into a shape corresponding to said end faces of said core and including spaced openings aligned with said spaced openings in said core separated by solid end portions to overlie the solid end face portions of said pole pieces with the magnet wires passing thereover to provide magnet wire end turn structure, said plate members including end turn restraining and ventilating means positioned along the peripheral border thereof adjacent said solid end portions to help maintain said magnet wire end turns a preselected distance relative said stator core central axis and to provide ventilation of magnet wire end turn structure, a portion of said end turn restraining and ventilating means being positioned immediately adjacent said end turns to restrain said end turns and a portion being spaced from said end turns to allow ventilation of said end turns.

2. The improved stator end cap insulator assembly of claim 1, said end turn restraining and ventilating means being in the form of an end turn peripheral restraining flange having ventilating aperture means disposed in said portion spaced from said end turns therein.

3. The improved stator end cap insulator assembly of claim 2, said restraining flange including fastening means to secure said external lead wire means connected to said magnet wires.

4. The improved stator end cap insulator assembly of claim 3, said restraining flange further including guide means to maintain said fastening means in preselected secured position relative said restraining flange.

5. The improved stator end cap insulator assembly of claim 3, said fastening means including a longitudinally extending belt with a buckle fastened at one end thereof, said belt being sized to be looped throgh said ventilating aperture means of said flange, around a stator lead wire connected to said magnet wire around a portion of said ventilated flange and through said buckle to secure said lead wire in fast position relative said stator core.

6. The improved stator end cap insulator assembly of claim 5, said ventilated flange including spaced guide standards between which said belt passes to be maintained in preselected secured position relative said ventilated flange.

7. An improved stator end cap insulator assembly for a stator core having pole pieces circumferentially spaced about the central axis of said core separated by openings extending through said core with magnet wires wound around each pole to extend through adjacent openings on opposite sides of the same pole and an external stator lead wire connected to said magnet wires comprising:

molded end cap insulator structure for attachment to opposite end faces of said core including a pair of plate members formed into a shape corresponding to said end faces of said core and including spaced openings aligned with said spaced openings in said core separated by solid end portions to overlie the end faces of said pole pieces with the magnet wires passing thereover to provide magnet wire end turn structure, said plate members including radially spaced end turn restraining and ventilating means in the form of sets of opposed inner and outer peripheral flanges extending integral with and normally from said solid end portions facing said end faces of said pole pieces whereby said flanges maintain said magnet wire end turns a preselected distance relative said stator core central axis, at least said outer peripheral flanges each including a portion spaced from said end turns and having a ventilating aperture therein to provide a bridge-like form with an upper span about said ventilation aperture and a portion immediately adjacent said end turns to restrain said end turns; and fastening means for said external stator lead wire connected to said magnet wire to secure said external stator lead wire in fast position relative said stator core, said fastening means including a longitudinally extending flexible plastic belt having a buckle integral with and fastened at one end thereof, said belt being sized to be looped through said ventilating aperture, around said external stator lead wire, said upper span and through said buckle to secure said external stator lead wire to said upper span of said bridge-like form, said upper span including spaced guide standards extending from the under portion thereof between which said belt passes to be maintained in preselected secured position relative said upper span.

* * * * *